(12) United States Patent
Abe et al.

(10) Patent No.: US 8,585,798 B2
(45) Date of Patent: Nov. 19, 2013

(54) METHOD FOR RECOVERING METAL FROM ORE

(75) Inventors: Yoshifumi Abe, Ibaraki (JP); Hiroshi Hosaka, Ibaraki (JP); Kazuaki Takebayashi, Ibaraki (JP); Yasunari Ishiguro, Ibaraki (JP); Akira Yoshimura, Ibaraki (JP)

(73) Assignee: Nippon Mining & Metals Co., Ltd., Tokyo (JP)

( * ) Notice: Subject to any disclaimer, the term of this patent is extended or adjusted under 35 U.S.C. 154(b) by 580 days.

(21) Appl. No.: 12/232,103

(22) Filed: Sep. 10, 2008

(65) Prior Publication Data

US 2009/0241736 A1  Oct. 1, 2009

(30) Foreign Application Priority Data

Mar. 27, 2008 (JP) ................. 2008-084597

(51) Int. Cl.
    *C22B 11/00* (2006.01)
(52) U.S. Cl.
    USPC ............................. 75/744; 75/743
(58) Field of Classification Search
    USPC .................. 75/720, 744, 743; 205/582
    See application file for complete search history.

(56) References Cited

U.S. PATENT DOCUMENTS

| | | | |
|---|---|---|---|
| 4,039,406 A | 8/1977 | Stanley et al. | |
| 4,594,132 A | 6/1986 | Satchell, Jr. et al. | |
| 4,971,662 A | 11/1990 | Sawyer et al. | |
| 5,431,788 A * | 7/1995 | Jones | 205/582 |

(Continued)

FOREIGN PATENT DOCUMENTS

| | | |
|---|---|---|
| AU | 42999/93 B | 1/1994 |
| AU | 669906 | 6/1996 |

(Continued)

OTHER PUBLICATIONS

Canadian Office Action, dated Feb. 1, 2011, for Canadian Application No. 2,648,252.

(Continued)

*Primary Examiner* — Weiping Zhu
(74) *Attorney, Agent, or Firm* — Birch, Stewart, Kolasch & Birch, LLP

(57) ABSTRACT

The copper sulfide ore is leached in the halide bath without using a special oxidant but with the use of only air. The copper and gold in the copper sulfide ore can be leached at high leaching ratio.
The treating steps are as follows.
(1) Copper leaching process (CL). The raw material is charged into the first acidic aqueous solution, which contains cupric chloride, ferric chloride, 7 g/L of hydrochloric acid, and sodium chloride. The post-leach liquor contains copper in cuprous state ions and copper in cupric state ions.
(2) Solid-Liquid separation step. The resultant solid and liquid of CL step are separated.
(3) Air oxidation step (OX). Air is blown into the post solid-liquid separation liquor. The copper in cuprous state ions are oxidized to the copper in cupric state ions. The iron leached in the step (1) is oxidized. Simultaneously, the impurities leached in the step (2) are precipitated.
(4) Copper extracting step (CEX). The copper is recovered from the post-liquor of the step (3)
(5) Gold recovering step (AL). The residue separated in the step (2) is added to the leach liquor similar to that of the step (1). The steps (1) and (5) are carried out under the atmospheric pressure and at the temperature of boiling point or lower, while blowing air into the leach liquor.

16 Claims, 4 Drawing Sheets

(56) References Cited

U.S. PATENT DOCUMENTS

| | | | |
|---|---|---|---|
| 6,159,356 A | 12/2000 | Zoppi | |
| 7,842,120 B2 | 11/2010 | Abe et al. | |
| 2002/0004023 A1 | 1/2002 | Jones | |
| 2004/0047780 A1 | 3/2004 | Jones et al. | |
| 2009/0158894 A1* | 6/2009 | Haavanlammi et al. | 75/720 |

FOREIGN PATENT DOCUMENTS

| | | |
|---|---|---|
| AU | 2003287781 A2 | 7/2004 |
| CA | 1105410 A | 7/1981 |
| CA | 2101514 A1 | 1/1995 |
| JP | 55-65332 A | 5/1980 |
| WO | WO-94/00606 A1 | 1/1994 |
| WO | WO 96/41026 A1 | 12/1996 |
| WO | WO-2004/059018 A1 | 7/2004 |
| WO | WO-2007/093666 A1 | 8/2007 |

OTHER PUBLICATIONS

Partial English translation only of a Japanese Office Action, dated May 25, 2010, for Japanese Application No. 2008-207363.
US Office Action, dated Oct. 6, 2011, for U.S. Appl. No. 12/349,155.

* cited by examiner

METHOD FOR RECOVERING METAL FROM ORE

BACKGROUND OF INVENTION

1. Field of Invention

The present invention relates to a method for recovering valuable metals contained in ore by way of leaching and dissolving the ore in the aqueous solution to recover the objective metals. More specifically, the present invention relates to leaching copper and gold and separating and recovering them in serial steps.

2. Background Technique

Copper from copper-sulfide ore among the ores is recovered by a smelting method, in which the ore is smelted at a temperature usually exceeding 1000 degree C., and the impurities, particularly iron, are fixed in the slag and are separated from the copper. In the smelting process, the refined copper sulfide ($Cu_2S$) referred to as the copper matte is yielded, and the noble metals concentrated in the copper matte are subsequently recovered. In the smelting process, since sulfur of the copper-sulfide ore is gasified in the form of sulfur dioxide, it must be subjected to the waste gas treatment. In addition, a refining process at a high temperature is carried out after smelting. A large amount of fuel is, therefore, consumed in the post-smelting refining process. Furthermore, when the impurity level of raw material becomes high, the amount of reverts increases so much that the treatment efficiency is lowered. The ore capable of smelting has a certain limited ratio of sulfur to copper. Processing efficiency of the raw material having low copper grade is disadvantageously low.

Various hydrometallurgical processes for treating the copper-sulfide ore in aqueous solution have been developed to eliminate such drawbacks involved in the smelting as waste-gas treatment, a large fuel consumption, and the limitations of impurities and copper grade of raw material. A hydrometallurgical process for recovering copper from the copper ore and the like is established with regard to the sulfuric-acid leaching. This leaching is combined with solvent extraction and electrowinning and is referred to as an SX-EW. Commercial plants of SX-EW have been operated in practice.

However, the copper ore, which can be leached in the sulfuric acid bath is, the one mainly consists of oxide, since sulfuric acid leaching of copper sulfide is disadvantageous in slow leaching speed, low leaching ratio and difficult recovery of precious metal. SX-EW is not commercially carried out with regard to the copper concentrate, the copper grade of which is enhanced by dressing.

Proposal to avoid the operation at high temperature and high pressure have also been made to enhance the leaching ratio of copper by using the halide solution. However, quality of copper recovered in the halide solution is poor. An electrolytic tank for recovering the copper in the halide bath is complicated in structure.

When one compares the smelting process and hydrometallurgical process, it is noticeable that precious metal behaves in a different manner. The precious metal is difficult to recover in the hydrometallurgical process. In the hydrometallurgical process, the copper dissolved in the solution is recovered, while the leach residue containing the precious metal is re-treated for recovering. The yielded leach residue is in a large amount and contains a few tens g/t of precious metal, a few thousands g/t of unleached copper, and a considerably larger amount of unleached iron. These grades of metals necessitate to consume a large amount of reagents for recovering precious metal. For example, cyanide is usually used for leaching gold, since a cyanide forms a stable complex with gold. However, since the cyanide also forms stable complexes with copper and iron, a huge amount of the cyanide is consumed, when it is used for leaching the residue mentioned above. In addition, since a cyano specie is toxic, sodium cyanate, which is stable, is usually used. However, cyano gas is easily formed from the sodium-cyanate solution, when the acid concentration rises. It is, therefore, necessary to extremely strictly control the leaching solution. In addition, the location, where a plant using the sodium-cyanide solution is permitted to build, is being limited.

AU Patent No. 669906 entitled as "Production of Metals from Minerals" (hereinafter referred to as Patent Document 1) and AU patent application 2003287781 entitled as "Recovering Metals from Sulfidic Materials" (hereinafter referred to as Patent Document 2) propose a hydrometallurgical method employing neither high temperature nor high pressure. In these methods, the sulfide ore is leached in a halide bath based on the aqueous chloride solution. Gold is recovered as well. In the method of Patent Document 1, acidic Cl—Br based electrolyte solution, which has high oxidation-reduction potential and contains copper in the form of $Cu^{2+}$, is reverted to the copper leaching process of the sulfide ore. Air is blown into the leach liquor, with the result that $Cu^{1+}$ is leached from the sulfide ore. The copper in cuporus state electrowinning is then carried out. However, the halide, that is, a halex, typically $BrCl_2^-$, used in this method for leaching is difficult to handle and is harmful. Special oxidizing agent such as oxygen, halogen gas, e.g., chlorine gas, or the like, must be used to enhance the leaching ratio of gold. In addition, since the electrowinning of copper is carried out using chloride bath, the electrolytic copper is of poor quality and must be subjected to expensive refining. Furthermore, an electrowinning plant is complicated, and its maintenance is disadvantageously difficult.

CA Patent 1105410 entitled as "Method of Obtaining Copper From Sulphurized Concentrates" proposes to produce a high-quality copper, by a method comprising the steps: leaching the copper concentrates in the halide bath; extracting the copper ions of the halide bath into the organic solvent; separating the organic phase and the aqueous phase; then bringing the organic phase into contact with the sulfuric acid to convert the copper to the copper sulfate; and, electrowinning by way of a conventional sulfuric acid bath. The electrolytic copper obtained has improved quality. In this method, chalcopyrite is leached and successively an air-blowing step for oxidizing the copper in cuporus state to the copper in cupric state is carried out. The liquor in the oxidizing step is reverted to leaching step. Although the copper can be leached, disadvantageously, the gold contained in the copper concentrate cannot be leached. At present, it is difficult to treat ores in a large scale by the hydrometallurgical process using the halide, in the light of cost and management. Mining developments at present are not based on the hydrometallurgical process using the halide bath.

SUMMARY OF INVENTION

These drawbacks of the hydrometallurgical process can be solved by AU Patent No. 669906 entitled as "Production of Metals from Minerals". This AU patent proposes a halide bath leaching characterized by simultaneous copper and gold recoveries and is referred to as INTEC process. The electrolytic copper obtained in the halide bath has poor shape and quality. Since an apparatus for producing the halex is the same as the apparatus for electrolytic deposition and recovery of copper, the operation is complicated. The proposed method is, therefore, inappropriate for treatment in the large scale.

It is, therefore, an object of the present invention to provide a hydrometallurgical method for recovering copper and gold, which can eliminate the drawbacks of the prior art. Specifically, the copper sulfide ore should be leached in the chloride bath at high leaching ratio without use of special oxidizing agent but with the use of only blown air.

In accordance with the objects of the present invention, there is provided the following methods.

(1) A method for recovering copper and gold by treating sulfide ore containing gold or the sulfide ore bearing silica ore, in which gold is contained (hereinafter referred to as "the raw material"), the method comprises:

a copper-leaching step, in which the raw material is added into the first acidic aqueous solution, which contains chloride and bromide of alkali metal or alkali earth-metal, as well as chlorides of copper and iron or bromides of copper and iron, and air is blown in at least certain period, into the first acidic aqueous solution, thereby obtaining the leach liquor, in which the cuprous ions and cupric ions are contained:

a solid-liquid separating step, in which the unleached raw material and the leached copper is subjected to solid-liquid separation;

an air-oxidizing step, in which air is blown into the post solid-liquid separation liquor, thereby oxidizing at least a part of the cuprous ions contained in the post solid-liquid separation liquor to the cupric ions, oxidizing the iron leached in the copper-leaching step, and simultaneously co-precipitating the impurities leached in the copper leaching step, followed by separating the precipitates;

a copper-extracting step, in which copper is extracted from the post-liquor of the air-blowing step, from which liquor the precipitates have been separated; and, a gold-recovery step, in which the residue, which has been separated in the solid-liquid separating step, is added to the second acidic aqueous solution, which contains chloride and bromide of alkali metal or alkali earth-metal, as well as chlorides of copper and iron or bromides of copper and iron, and air is blown into the second acidic aqueous solution under the atmospheric pressure, at a temperature lower than boiling point of the second aqueous solution, and under the presence of iron.

(2) A method for recovering copper and gold from ore according to (1), characterized in that the gold concentration of the second acidic aqueous solution is maintained at 1.5 mg/L or less.

(3) A method for recovering copper and gold from ore according to (1) or (2), characterized in that the copper leaching step comprises a plurality steps, in which the leach residue of a preceding step is successively transferred to a subsequent step, and a leach liquor is distributed to the plurality of the copper leaching steps.

(4) A method for recovering copper and gold from ore according to (3), wherein the post leach liquor of the respective plurality stages of copper leaching is withdrawn from the respective stages and is totally mixed with each other, and subsequently, the mixed leach liquor is supplied to the air-blowing step.

(5) A method for recovering copper and gold from ore according to any one of (1) through (4), characterized in that the first acidic aqueous solution and the second acidic aqueous solution contain the chloride ions and the bromide ions at a total concentration in a range of from 120 g/L to 200 g/L.

(6) A method for recovering copper and gold from ore according to any one of (1) through (5), wherein the leaching temperature in the copper leaching step is 70 degree C. or higher.

(7) A method for recovering copper and gold from ore according to any one of (1) through (6), wherein the copper extracting step consists of solvent extraction, ion-exchange, electrowinning or substitution, or combination of them.

(8) A method for recovering copper and gold from ore according to (7), wherein essentially all of the cuprous ions is oxidized to the cupric ions in the air-oxidation step, and the solvent extraction is carried out in the copper extracting step.

(9) A method for recovering copper and gold from ore according to (8), wherein the solvent extracted copper is scrubbed into the sulfuric acid solution.

(10) A method for recovering copper and gold from ore according to any one of (1) through (9), wherein the leaching temperature in the gold recovering step is 60 degree C. or higher

(11) A method for recovering copper and gold from ore according to any one of (1) through (10), wherein the active carbon or active carbon plus lead nitrate is charged into the second acidic aqueous solution.

(12) A method for recovering copper and gold from ore according to any one of (1) through (10), wherein it comprises subsequent to the gold recovering step a treatment step by active carbon adsorption, solvent extraction, ion exchange of substitution, or any combination of them.

(13) A method for recovering copper and gold from ore according to any one of (1) through (12), characterized in that it further comprises a step of grinding the raw material for grinding the raw material so that 80% or more of the entire raw material is ground to a particle diameter of 40 μm or less.

(14) A method for recovering copper and gold from ore according to any one of (1) through (13), characterized in that it comprises a step of recovering valuable metal other than copper and gold from the copper leach solution, the copper leach-residue or the gold leach residue.

The present invention is described more in detail with regard to preferred embodiments with reference to the drawings.

DESCRIPTION OF PREFERRED EMBODIMENTS

Figure 1:
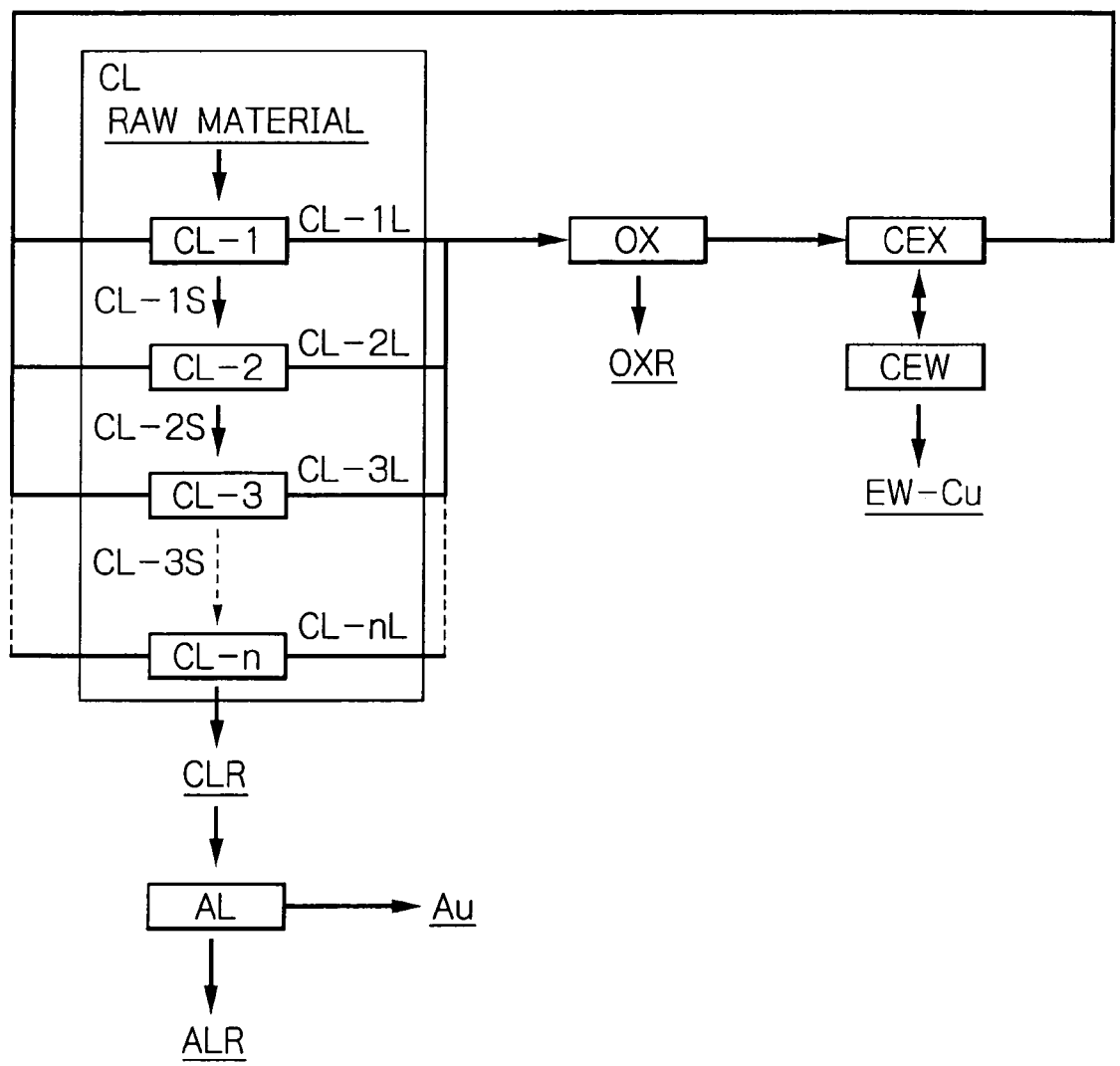
FIG. 1 is a flow chart of the process according to the present invention.
Figure 4:
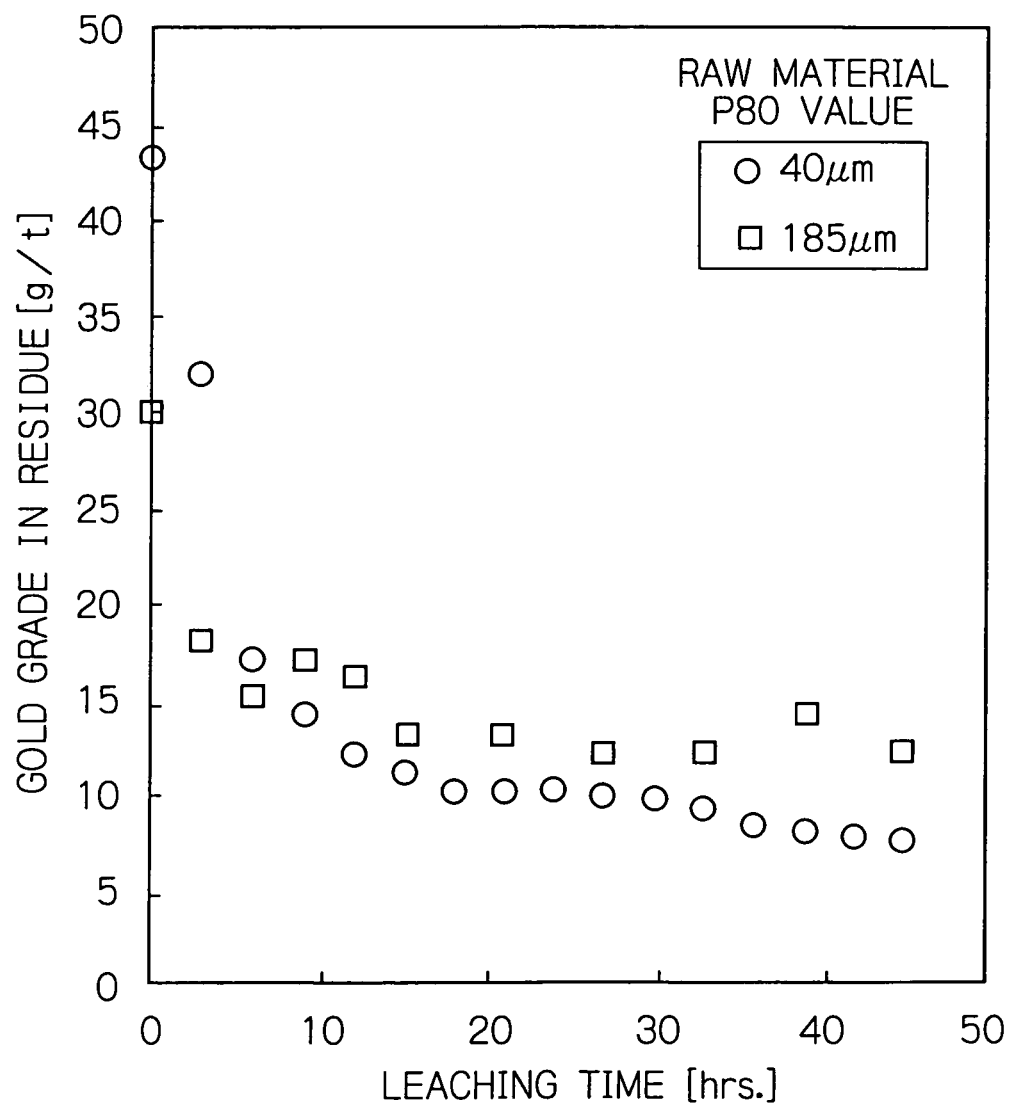
FIG. 4 is a graph showing an influence of the particle size of raw material upon the gold leaching.

The present invention is described hereinafter with reference to FIG. 1 with regard to an embodiment of the copper and gold recovering process from the copper concentrate containing gold. The process is divided into four groups of copper leaching, oxidation, copper-extraction and gold recovery, which are denoted in FIG. 1 as CL, OX, CEX, CEW, and AL, respectively. In the embodiment shown in FIG. 4, the copper leaching consists of four stages. Number of these stages is adjusted depending upon the raw material to be treated.

Copper Leaching Step (CL)

The raw material is added into the mixed liquor (the first acidic aqueous solution) of cupric chloride, iron chloride, sodium chloride, and sodium bromide. Air is blown into the aqueous solution under the atmospheric pressure and at a temperature of 70 degree C. or higher. The raw material is thus brought into reactions to leach copper contained in the raw material. It is believed that the following reactions occur in the case of chalcopyrite, which is a representative copper sulfide ore, and the copper dissolves out.

$$CuFeS_2 + 3CuCl_2 \rightarrow 4CuCl + FeCl_2 + 2S \tag{1}$$

$$CuFeS_2 + 3FeCl_3 \rightarrow CuCl + 4FeCl_2 + 2S \tag{2}$$

The leaching ratio attained by these reactions is approximately from 30 to 75%.

Air is blown during the leaching for at least a certain period of leaching step, preferably in a later period of leaching step. In the leaching step the reactions (1) and (2) proceed. When air is blown during the leaching, the products of reactions (1) and (2), that is copper in cuporus state and the ferrous iron, are brought into the following reactions and oxidized to the copper in cupric state and the ferric iron, respectively. These copper in cupric state and the ferric iron contribute to continue the leaching reactions of copper.

$$CuCl + (1/4)O_2 + HCl \rightarrow CuCl_2 + (1/2)H_2O \tag{3}$$

$$FeCl_2 + (1/4)O_2 + HCl \rightarrow FeCl_3 + (1/2)H_2O \tag{4}$$

The chemical species formed by the reactions (3) and (4) can be utilized as the oxidant for leaching according to the reactions (1) and (2). The leaching ratio can, therefore be enhanced. The chemical reactions (3) and (4) proceed by the oxygen of blown air. Therefore, the cuprous chloride and ferrous chloride dissolved from the raw material are oxidized to the cupric chloride and ferric chloride, respectively, by blowing air during the leaching, with the result the leaching reactions of copper can continuously proceed.

The leaching reactions in the first acidic aqueous solution proceeds under the presence of only chlorides. However, under the additional presence of bromide, the oxidation-reduction potential of the leaching reactions lowers and hence the reaction speeds can be accelerated and hence the reaction time can be shortened. Therefore, it is preferred that the total concentration of chloride and bromide ions is in a range of from 120 g/L to 200 g/L. In this total concentration of the chloride and bromide, the dissolutions and reactions proceed at high efficiency.

In order to promote the leaching of copper, the raw material is preferably pulverized and ground. The particle size of ground raw material is such that 80% or more of the entire raw material is 40 μm or less in particle diameter. Preferably, the concentration of cupric chloride in the pre-leaching liquor is 20 g/L or more. The leaching temperature should be 70 degree C. or higher. Preferably, the leaching temperature is higher as the leaching reactions of copper are promoted at higher temperature.

In the embodiment described above, the oxidizing agent is both copper in cupric state and ferric iron. However, in the case of treating the ore, such as copper sulfide ore, in which the iron is present only in an impurity level, the oxidizing agent used for leaching the ore may be only the copper in cupric state.

Leaching in Multiple Stages

A plurality of the reaction tanks may be necessary in order to satisfactorily leach copper from the raw material. The leach liquor flows on the drawing in a direction from left to right as shown in FIG. 1, while the leach residue flows vertically in a downward direction on the drawing. These flows cross perpendicularly to one another.

Subsequent to the copper-leaching reaction in each stage, the solid-liquid separation by a filter press or the like or concentration by a filter or the like is carried out. The resultant residue or concentrated slurry is conveyed to the subsequent leaching stage.

The residue of copper leaching from the final copper leaching stage is subjected to solid-liquid separation and is conveyed to the gold-leaching step. The post-leach liquor separated in the respective leaching steps of copper is supplied to the copper extracting step described hereinbelow.

Oxidation Step (OX)

In order to oxidize the copper contained in the post leach liquor, the post-leach liquor produced from a plurality of copper leaching steps is mixed. Air is blown into the mixed liquor, to oxidize at least part of the copper in cupric state. As is shown in the equation (3), when the copper in cuporus state is oxidized, not only oxygen but also acid are consumed. The pH of the solution therefore rises. Along with the pH rise, the iron precipitates and acid, HCl, is formed as shown in the equation (5).

$$FeCl_3 + 2H_2O \rightarrow FeOOH + 3HCl \tag{5}$$

The oxidation of copper according to the reaction (3) can proceed using the acid (HCl) formed by the equation (5). When the oxidation of copper completes, the acid still remains and the residual acid causes reduction of pH of the solution. The equation (5) thus attains at equilibrium and the oxidation completes.

In the recovery of copper, cation-exchange-type organic extracting agent or solvent extraction agent may be used. In order to smoothly carry out the exchanging reactions, the leach liquor, in which the copper in cuprous state and copper in cupric state are present in mixture, is preferably preliminarily oxidized so as to prepare a solution, in which essentially all of the copper is cupric. When the copper in cuprous state is oxidized to the copper in cupric state, a part of iron and the other impurities may precipitate. Preferably, the precipitates are separated by way of filtration using a filter press or the like, since the exchanging reactions mentioned above smoothly proceed.

Copper Recovery Step (CEX and CEW)

Copper is recovered from the post copper-leaching liquor obtained in the copper leaching step mentioned above. The copper recovery can be carried out by way of any known solvent extraction, ion-exchange, electrowinning or substitution, or combination of them.

When the copper recovery is carried out by electrowinning in the chloride bath, the anodic and cathodic reactions are as follows as is described in Patent Document 1.

$$\text{Anodic reaction: } 2Cu^+ + 2e \rightarrow 2Cu \tag{6}$$

$$\text{Cathodic reaction: } 2Cl^- + Br^- \rightarrow BrCl_2^- \text{ (halex)} + 2e^- \tag{7}$$

Preferably, the organic metal-exchanging agent based on the cation exchange resin or the ion-exchange resin, which is known as a means for selectively recovering copper in the leach liquor, is used. When such extracting agent of resin is used, the copper ions are recovered and simultaneously protons are released in the solution as shown in the equation (8). The acid is thus formed in the solution.

$$2R-H + CuCl_2 \rightarrow R_2-Cu + 2HCl \tag{8}$$

In the equation (8), R indicates the organic metal-extracting agent or the functional group of ion-exchange resin.

Subsequent to the extraction of copper, the post-extracting liquor is reverted to the copper leaching step. Ferrous chloride, ferric chloride or hydrochloric acid alone or in combination can be fed to the post-extracting liquor in such a manner that its or their amount is necessary for dissolving the copper contained in the raw material into the post liquor in the form of cupric chloride. No halex is, therefore, required. The hydrochloric acid formed by the reaction (8) can be fed to the post extracting liquor.

The extracted amount of copper from the raw material and the non-extracted amount of copper remaining in the post-leach liquor may be relatively adjusted in such a manner that the amount corresponds to the amount participating in the oxidizing in the leaching step. That is, the non-extracted copper remaining in the post-extraction liquor is reverted to the leaching step and is utilized for the oxidation reaction. The amounts of copper in the leach liquor can be balanced. The acid formed as a result of extraction under the reaction (8) and the non-extracted copper in cupric state are utilized for the next leaching of copper. Therefore, the copper can be leached and recovered repeatedly without addition of reagents.

When the organic metal extracting agent is used, the extracting agent after the extracting is rinsed with a simple method and is then scrubbed. The copper sulfate solution can, therefore, be obtained. Metallic copper can be recovered from this copper sulfate solution by way of electrolytic deposition (reaction (9)). The electrowinning of copper in the sulfuric acid bath (CEW) is well known. Copper having high quality can be easily obtained. In addition, when the copper-sulfate solution is electrolyzed, metallic copper to be recovered deposits on the cathode. On the opposite anode, the electric deposition of water occurs on the opposite anode, with the result that the acid is formed (the equation (10)). This acid can be utilized for scrubbing copper from the extracting agent. No additional sulfuric acid is necessary to replenish, and hence the reagent can be saved.

$$\text{Anodic reaction: } CuSO_4 + 2e \rightarrow 2Cu + SO_4^{2-} \tag{9}$$

$$\text{Cathodic reaction: } H_2O \rightarrow 2H^+ + (\tfrac{1}{2})O_2 + 2e^- \tag{10}$$

Gold Leaching Step (AL)

In the preceding copper leaching step, the leach residue is yielded and contains gold. The gold is leached from the leach residue. This leach residue is added to the mixed liquor of copper in cupric state, iron chloride, sodium chloride and sodium bromide. The leach residue is dissolved in the mixed liquor under the atmospheric pressure, at 60 degree C. or higher and under air oxidation. The dissolved gold is immediately recovered by way of the following methods. A portion of the liquor in the gold-leaching reaction tank is withdrawn uninterruptedly and is subjected to the solid-liquid separation. The post-separated liquor is passed through the active carbon or ion exchanging resin or is subjected to solvent extraction. Gold can therefore be recovered. After recovery, the liquor is again returned to the gold-leaching reaction tank, from where the liquor has been withdrawn. Alternatively, the active carbon, ion-exchanging resin, or reagent for solvent extraction is preliminarily added to a gold-leaching reaction tank. The dissolved gold simultaneously adsorbs on the active carbon and the like.

In order to recover gold, the gold must be dissolved in and be present in a stable form in the solution. As is known, a gold complex, in which such halogen ions as chloride and bromide ions coordinate to the trivalent gold, is stable. The standard oxidation-reduction potential of $[Au^{3+}]/Au$ (which indicates an oxidation-reduction system of $Au^{3+} + 3e \rightarrow Au$, the same indication below) in the aqueous solution is 1500 mV. This oxidation-reduction potential is reduced to 1012 mV in the aqueous chloride solution. The leaching of gold can, therefore, be advantageously achieved at a lower oxidation-reduction potential. Such low oxidation-reduction potential is attained in the methods of Patent Documents 1 and 2 by using strong oxidizing agent such as the halex, chlorine and oxygen.

However, the oxidation-reduction potential of $[Au^{3+}]/Au$ is dependent upon the concentration of dissolved gold as is shown in the following equation.

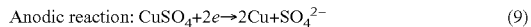

$$E = E^0 + (3F/RT) \log [Au^{3+}] \tag{11}$$

In this equation (11), $E^0$ is the standard oxidation-reduction potential. F is a Farady constant. R is a gas constant. T is temperature (K). This equation indicates that the gold can be leached at a lower oxidation-reduction potential in the solution with a lower gold concentration. For example, when the gold concentration is decreased from 1 mol/L to $10^{-2}$ mol/L, the oxidation-reduction potential is decreased by 354 mV, specifically to 646 mV in the chloride bath.

Meanwhile, the oxidation-reduction potential of $Fe^{3+}/Fe^{2+}$ system in the chloride bath is expressed by the following equation.

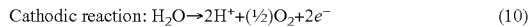

$$E = E^0 + (F/RT) \log [Fe^{3+}/Fe^{2+}] \tag{12}$$

Since the standard oxidation-reduction potential of this oxidation-reduction system is 681 mV, the gold can be leached while the oxidation-reduction of $Fe^{3+}/Fe^{2+}$ system takes place. In addition, since the oxidation of iron in the $Fe^{3+}/Fe^{2+}$ system can take place by oxygen of the air, the leaching of gold can be achieved totally under the presence of the thus oxidized iron in the solution. When the dissolved gold is recovered by using the active carbon or the like, the gold can be continuously leached.

In Patent Document 1, the halex, typically $BrCl_2^-$, is toxic halide which is difficult to handle, is used in the leaching to enhance the leaching ratio of gold. In addition, the oxidation-reduction potential (vs Ag/AgCl) is 700 mV and is high (Example 4). Contrary to this, in the present invention, high leaching ratio is obtained by a method, where the halex is not used, but the air blowing is carried out, and the oxidation reduction potential (vs Ag/AgCl) is 500 mV.

In Patent Document 2, the leaching ratio of gold is 59%, when only air plus oxygen are used. The leaching ratio can be enhanced to 95% by using the chlorine, which is strong oxidant but is harmful. In the present invention, the leaching ratio is as high as 95% only by blowing air.

In the present invention, valuable metals such as silver, nickel, cobalt, zinc and the like are leached together with copper and gold. The so-extracted valuable metal accumulates in the copper-leach liquor or the gold-leach liquor. These valuable metals can be recovered by the same method as recovering valuable metals from the chloride bath. Specifically, the copper and iron in the leach liquor are removed, and then the valuable metals can be recovered by substitution, solvent extraction or ion-exchange. Alternatively, the valuable metals are directly recovered from the leach liquor. In addition, the valuable metals, which are not leached but remains in the residue, can also be recovered by leaching the residue under different conditions to leach the remaining valuable metals.

The present invention attains the following advantages

The raw material treated by the present invention is sulfide ore containing copper and precious metal. The raw material treated by the present invention is also the silicate ore containing gold. Such materials are not pretreated by a special method but are readily treated by the first acidic aqueous solution. The reactions proceed under the atmospheric pressure and at a temperature of boiling point or lower. A special equipment is, therefore, not necessary.

The oxygen of the air blown into solution oxidizes copper and iron chlorides and/or bromides. The so-oxidized chlorides and bromides act as the oxidant. Therefore, no particular oxidant is necessary for leaching copper. Since the raw material contains the copper and iron, these copper and iron can be utilized for leaching copper or gold. Therefore, the reagent cost can be saved.

The first acidic aqueous solution has the components described above. The leaching of copper is carried out in the halide bath, and, therefore, such passivation reactions as in the case of the sulfuric acid-bath leaching does not occur on the material being leached. The reaction time is, therefore, so short that the reaction tank can be small sized, and the investing cost can be saved.

The leaching of gold in the second acidic aqueous solution is similar to the first acidic aqueous solution. Namely, the copper and gold can be effectively leached. Neither cyanide, which is toxic, nor chlorine gas, which is special oxidant, are used for leaching gold at high efficiency. Since the leaching reaction of gold can be promoted by maintaining the gold concentration in the solution to a low level, the reaction time can be shortened and hence the reaction tank can be small sized. The investing cost can, therefore, be saved. A special plant is not used. Special reagents such as cyanide and mercury are not used.

Since the copper leaching step and the gold leaching step according to the present invention are operative under the atmospheric pressure, such a special apparatus as an autoclave is not used. Fundamental apparatuses used in the leaching steps of the present invention are a reaction tank, a stirrer, and a thickener or filter press. The combination of these apparatuses is so simple that the leaching can be kept to operate in the vicinity of a mine.

In the copper leaching according to the present invention, impurities, particularly arsenic, are leached. Since the once leached impurities are then precipitated during the oxidation step, the copper can be recovered from the liquor after the solid-liquid separation. An influence of the impurities upon the recovered copper can, therefore, be excluded. In the method of the present invention, the reaction (5) is suppressed during the leaching step of copper. In other words, the leaching process of copper (CL) and the oxidation step (OX) are separated. The gold concentration in the residue can be maintained high.

The post copper-leach liquor is reverted to the leaching step of the raw material. The chloride and bromide based reagents are, therefore, virtually not consumed. Corrosive or highly toxic reagents need not be used as the oxidant.

Even when the copper grade of the raw material varies, the concentration of copper leached into the solution can be maintained at a constant level, by way of changing addition amount of the raw material into the leach liquor. When the copper grade of raw material is low, the amount of first acidic aqueous solution is also decreased, in such a manner that the concentration of the leached copper can be maintained at a constant level. Such a low copper-grade concentrate that cannot be treated in the smelting method, for example, a concentrate having 16% of copper grade, 90 g/t of gold grade, and 1250 ppm of arsenic grade as an impurity, can be treated by a hydrometallurgical method of the present invention. The transporting gross amount of such low copper-grade concentrate is larger than that of high-copper grade concentrate, provided that the amount of valuable metals is identical. When such low grade concentrate is transported from a mine to a smelter, the marine and land transporting costs are very expensive and is burden of the mine. Meanwhile, a smelter cannot refine such concentrate having high content of impurities, although the grade of gold is attractive. Such ore can be found in mines, which have been developed as the gold mine at the beginning.

The solid-liquid separation and the solvent extraction are the known methods, which have been conventionally carried out. The known methods are employed in several steps of the present invention. Management of these methods is easy. It may be difficult to develop a mine, when one intents to leach and recover valuable metal only by the hydrometallurgical process. In the present invention, the hydrometallurgical process and known extracting methods mentioned above are appropriately combined. It is, therefore, expected to develop a mine in a large scale.

In the method of the present invention (claim 2), the gold concentration in the gold leaching step is maintained at a low level. The leaching efficiency of gold can, therefore, be enhanced.

In the case of multiple stage leaching (claim 3), the leaching reaction speed of copper can be accelerated.

The flow of materials to be treated are cross-wise (claim 4). The flow of materials to be treated is simple, and the plant can be small sized.

When the leaching temperature is 100 degree C. or less, and the air is blown into the leach liquor at the atmospheric pressure, the leaching ratio of copper is 98% or more, and the leaching ratio of gold is 95% or more (claims 6 and 10).

Operation is easy since the known extraction of copper is employed (claim 7). The electrolytic copper having improved quality can be produced by electrolyzing the copper sulfate solution (claim 8).

When lead ions, such as lead nitrate, are co-present, the leaching reactions of copper can be promoted (claims 10 and 11). The reaction time can be shortened and the reaction tank can be of small sized. The investing cost can be saved.

When the raw material containing copper and gold is pulverized, the leaching efficiency and recovery efficiency can be enhanced (claim 12)

BEST MODES FOR CARRYING OUT INVENTION

Example 1

The leach liquor (the first acidic aqueous solution) prepared contained 20 g/L of cupric chloride in terms of copper concentration, 2 g/L of ferric chloride in terms of iron concentration, 7 g/L of hydrochloric acid, 180 g/L of total chloride ions, which chloride is that of copper chloride, hydrochloric acid and iron chloride, and 22 g/L of sodium bromide in terms of bromide ions. The raw material was copper concentrate having composition of 22% of Cu, 24% of Fe and 27% of S. The copper concentrate was ground to provide 18 μm of the particle size P80 value. 400 g of the copper concentrate, which has been ground to that particle size, was added to 4 L of the leach liquor mentioned above.

The leach liquor was heated to 85 degree C. The raw material concentrate was added to the leach liquor during stirring. The leaching was thus carried out. After reaction for a predetermined time, filtration was carried out. The leach liquor was again added to the leach liquor mentioned above. This leaching was carried out in four stages. Sequential change of copper grade in the leach residue was observed. Air blowing was not carried out in the first and second stages, while the air blowing was carried out in the third and fourth stages at 1.0 L/min of flow rate. In table 1, the experimental results of the present example are shown.

TABLE 1

| Reaction Stage | Reaction Time (hrs) Each Stage | Reaction Time (hrs) Accumulative | Reaction Temperature ° C. | Air Blowing L/min | End of Reaction ORP mv | End of Reaction pH | Copper Grade in Residue % | Leaching Ratio of Copper % |
|---|---|---|---|---|---|---|---|---|
| Before Reaction | 0 | 0 | — | — | — | — | 22 | 0.0 |
| 1 | 4.0 | 4.0 | 85 | 0 | 389 | 2.00 | 20 | 33.2 |
| 2 | 5.0 | 9.0 | 85 | 0 | 390 | 0.30 | 10 | 73.8 |
| 3 | 5.0 | 14.0 | 85 | 1.0 | 480 | 1.74 | 0.8 | 98.0 |
| 4 | 5.0 | 19.0 | 85 | 1.0 | 559 | 1.26 | 0.5 | 98.7 |

ORP shown in the table is measured with a reference electrode of Ag/AgCl

As is shown in the examples, the copper leaching ratio increases with the temperature. It amounted to 98.0% in the third stage, where the accumulative leaching time is 14 hours. It amounted to 98.7% in the fourth stage, where the accumulative leaching time is 19 hours. The leach liquor obtained as result of the entire four stages was 14.8 L. The concentration of copper in cuprous state was 14.1 g/L, while the concentration of copper in cupric state was 12.8 g/L.

Example 2

The pre-extraction liquor (the leaching liquor of the copper leaching step) prepared contained 10 g/L of cupric or cuprous chloride in terms of copper concentration, 108 g/L of total chloride ions including those of copper chloride, and 13 g/L of sodium bromide in terms of bromide ions. As the extracting agent, LIX 984 was diluted by Isoperm M to 20% of the volume ratio. The pre-extraction liquor and the extracting agent were mixed at 1:1 of volume proportion, and were stood still until the organic phase and the aqueous phase were separated. The copper concentration in the aqueous phase was measured. The extracting condition and results are shown in Table 2.

TABLE 2

| Test No. | Concentration of Pre-extraction Liquor (g/L) T-Cu | $Cu^+$ | $Cu^{2+}$ | Cl | Br | Concentration of Extracting Agent (vol. %) | O/A Ratio | Concentration of Post-extracting Agent (g/L) T-Cu | $Cu^+$ | $Cu^{2+}$ | Copper Concentration in Organic Phase (*g/L) |
|---|---|---|---|---|---|---|---|---|---|---|---|
| ① | 10.5 | 0 | 10.5 | 113 | 14.3 | 20 | 1.0 | 4.5 | 0 | 4.5 | 6.0 |
| ② | 9.8 | 8.0 | 1.8 | 118 | 16.9 | 20 | 1.0 | 8.8 | 6.7 | 2.1 | 1.0 |

Remarks.
*Copper concentration in the organic phase is calculated value.

As is apparent from this example, $Cu^+$ is not extracted but $Cu^{2+}$ is extracted in LIX984. It is, therefore, turned out that the oxidation of $Cu^+$ to $Cu^{2+}$ in the post leach liquor is necessary for recovering the copper by LIX984. The test No. ① in Table 2 is an example of claim 8, while the test No. ② in Table 2 is a comparative example of claim 8.

Example 3

The post leach liquor of copper concentrate was subjected to air oxidation. The resultant liquor was used as the pre-extracting liquor. LIX 984 was diluted with Isoperm M to 20% of volume proportion. The extracting test was carried out.

Subsequent to the extraction, the organic phase was rinsed with water, and then, the scrubbing was carried out using 180 g/L of dilute sulfuric acid. The organic phase subsequent to the scrubbing was rinsed with pure water. The resultant respective aqueous phases were analyzed, to investigate to distribution of copper and halogens.

In Table 3, the experimental conditions and results are shown.

TABLE 3

| Operation | Amount of Liquor Used (ml) | | Concentration and Amount of Pre-liquor | | | | | |
|---|---|---|---|---|---|---|---|---|
| | | | Cu | | Cl | | Br | |
| | Aqueous Phase | Organic Phase | Concentration (g/L) | Amount (g) | Concentration (g/L) | Amount (g) | Concentration (g/L) | Amount (g) |
| Extraction | 50 | 75 | 29.0 | 1.45 | 176 | 8.8 | 21.5 | 1.08 |
| Rinsing ① | 70 | 70 | 0 | 0 | 0 | 0 | 0 | 0 |
| Scrubbing | 65 | 65 | 0 | 0 | 0 | 0 | 0 | 0 |
| Rinsing ② | 60 | 60 | 0 | 0 | 0 | 0 | 0 | 0 |

| Operation | Concentration and Amount of Post-liquor | | | | | | | |
|---|---|---|---|---|---|---|---|---|
| | Cu | | Cl | | Br | | $SO_4$ | |
| | Concentration (g/L) | Amount (g) | Concentration (g/L) | Amount (g) | Concentration (g/L) | Amount (g) | Concentration (g/L) | Amount (g) |
| Extraction | 23.4 | 1.17 | 170 | 8.5 | 21.4 | 1.07 | — | — |
| Rinsing ① | <0.001 | — | 0.13 | 0.01 | <0.01 | <0.001 | — | — |
| Scrubbing | 4.0 | 0.28 | 0.002 | <0.001 | <0.01 | <0.001 | — | — |
| Rinsing ② | <0.001 | — | 0.002 | <0.001 | <0.01 | <0.001 | 2.2 | 0.132 |

As is apparent from this example, the copper in the organic phase is scrubbed into the aqueous phase by using 180 g/L of dilute sulfuric acid (claim 9). In addition, the chloride is incorporated into the post-extracting organic phase. When this phase is rinsed with pure water, the chloride can be removed without loss of copper. In addition, the sulfate ions are incorporated into the post-scrubbing organic phase. The sulfate ions can also be removed by rinsing the pure water.

Example 4

The leach liquor (the post precipitate-removal solution), which is reverted to the leaching step contained from 5 g/L to 20 g/L of cupric chloride in terms of copper concentration, 2 g/L of ferric chloride in terms of iron concentration, 7 g/L of hydrochloric acid, 180 g/L of total chloride ions, which includes that of copper chloride, hydrochloric acid and iron chloride, and 22 g/L or 13 g/L of sodium bromide in terms of bromide ions. The raw material was copper concentrate having composition of 22% of Cu, 24% of Fe and 27% of S. The copper concentrate was ground to provide 18 μm of the particle size P80 value. 400 g of the copper concentrate, which has been ground to that particle size, was added to 4 L of the leach liquor mentioned above.

The leach liquor was heated to 85 or 70 degree C. The raw material concentrate was added to the leach liquor during stirring. The leaching was carried out by blowing air at a flow rate of 1.0 L/min. After the reactions for a predetermined time, the filtration was carried out. The leach residue was again leached in the leach liquor mentioned above. This leaching was carried out in a plurality of stages. The sequential change of copper grade in the residue was observed. In table 4, the experimental results of the present example are shown.

TABLE 4

| Test No. | Ion Concentration of Chloride and Bromide (g/L) | | Reaction Temperature (°C.) | Stage | Accumulative Reaction Time (hrs) | Blown Air (L/min) | Copper Grade of Final Residue (%) | Leaching Ratio of Copper (%) |
|---|---|---|---|---|---|---|---|---|
| | Cl | Br | | | | | | |
| ① | 108 | 13 | 85 | 4 | 17.5 | 1.0 | 0.3 | 99.4 |
| ② | 180 | 22 | 70 | 5 | 17.2 | 1.0 | 0.7 | 98.3 |
| ③ | 108 | 13 | 70 | 5 | 17.3 | 1.0 | 2.7 | 92.2 |
| ④ | 180 | 22 | 85 | 3 | 14.0 | 1.0 | 0.8 | 98.0 |
| Comparative Example | 108 | 13 | 50 | 6 | 26.5 | 1.0 | 17.0 | 11.1 |

As is apparent from this example, leaching speed of copper is influenced by the chloride and bromide concentrations and the reaction temperature. In order that the copper grade in the leach residue is decreased to 1% or less for a short period of time, the total concentration of chloride and bromide should be more than 120 g/L (claims 5 and 6) In addition, the reaction temperature should be higher than 70 degree C. In Test No. ③, where the total concentration of chloride and bromide ions is 121 g, and the reaction temperature is 70 degree C., the copper grade does not decrease to 1% or less. As is shown in Comparative Example, when the reaction temperature is 50 degree C., the copper grade in the residue can be decreased only to 17.0%, the leaching ratio of copper is only 11.1%, although the reaction time is as long as 25 hours or longer. From these results, it is apparent that the reaction speed of copper leaching is greatly influenced by the total concentration of chloride and bromide, and the reaction temperature.

Example 5

The leach liquor (the second acidic aqueous solution) used contained 25 g/L of cupric chloride in terms of copper concentration, 5 g/L of ferric chloride in terms of iron concentration, 180 g/L of total chloride ions, which chloride is that of copper chloride, and iron chloride, and 22 g/L of sodium bromide in terms of bromide ions. The raw material used was the leach residue of the fourth copper leaching stage precedent to the gold leaching. Two kind of the raw materials were treated and 0.6 or 0.5% of Cu, 20 and 21% of Fe and 46 and 45% of S, respectively. 300 g of the residue was added to 2.5 L of the leach liquor mentioned above.

The leach liquor was heated to 60 or 85 degree C. The residues, each in amount of 630 g concentrate were added to the leach liquor during stirring. The leaching was thus carried out while blowing air at a flow rate of 0.2 L/min. After reaction for every three hours, filtration was carried out. Filtration was carried out at every 3 hours. The residue was recovered. A sample was taken from the recovered residue to analyze the gold grade in the residue. The residue, which was recovered at every three hours, was charged into fresh leach liquor. The leaching was again carried out. The leaching of this method was repeated for fifteen to sixteen times. In table 5, the experimental results of the present example are shown.

As is apparent from Table 5, in the case of leaching at 85 degree C. (an example of claim 10), the leaching ratio of gold amounts to 92.4% at the leaching time of 45 hours. In the case of leaching at 60 degree C. (an example of claim 10), the leaching ratio and the leaching speed are lower than those of leaching at 85 degree C. The leaching ratio amounts of 88.9% at the leaching time of 45 hours. It turns out that the leaching temperature of gold exerts a great influence upon the leaching ratio of gold. The leaching for 3 hours is an example of claim 2.

Example 6

The leach liquor (the second acidic aqueous solution) used contained 25 g/L of cupric chloride in terms of copper concentration, 5 g/L of ferric chloride in terms of iron concentration, 180 g/L of total chloride ions, which chloride includes that of copper chloride, and ferric chloride, and 22 g/L of sodium bromide in terms of bromide ions. The raw material used was the copper-leaching residue, in which the copper grade of sulfide ore is preliminarily decreased. This residue was obtained in the solid-liquid separation step. Two kind of the raw materials were treated. One kind contained 0.1% of Cu, 30% of Fe and 32% of S. The other kind contained 0.6% of Cu, 21% of Fe and 46% of S. 630 g of the respective copper-leach residues were added to 2.5 L of the leach liquor mentioned above.

The leach liquor was heated to 85 degree C. The residues, each in amount of 630 g concentrate were added to the leach liquor during stirring. The leaching was thus carried out while blowing air at a flow rate of 0.2 L/min. With regard to one residue, after reaction for 24 hours, filtration was carried out. The residue was recovered and the gold grade in the residue was analyzed. Filtration was carried out at every 3 hours. The residue was recovered. A sample was taken from the recovered residue to analyze the gold grade in the residue. The residue, which was recovered at every three hours, was charged into fresh leach liquor. The leaching was again carried out. The leaching of this method was repeated for eight times. In table 6, the experimental results of the present example are shown.

TABLE 5

| | 85° C. (Temperature of Leach Liquor) | | | 60° C. (Temperature of Leach Liquor) | | |
|---|---|---|---|---|---|---|
| Leaching Time (h) | Au Grade in Residue (g/t) | Leaching Ratio of Au (%) | Au Concentration In Liquor (mg/L) | Au Grade in Residue (g/t) | Leaching Ratio of Au (%) | Au Concentration In Liquor (mg/L) |
| 0 | 44 | 47.5 | 0.00 | 31 | 65.6 | 0.00 |
| 3 | 32 | 62.0 | 0.41 | 20 | 77.3 | 1.57 |
| 6 | 17 | 80.2 | 0.53 | 18 | 79.9 | 1.01 |
| 9 | 14 | 83.9 | 0.59 | 17 | 80.9 | 0.50 |
| 12 | 12 | 86.2 | 0.48 | 16 | 82.4 | 0.35 |
| 15 | 11 | 87.5 | 0.23 | 15 | 83.5 | 0.53 |
| 18 | 10 | 88.6 | 0.14 | 14 | 85.0 | 0.12 |
| 21 | 10 | 88.9 | 0.09 | 13 | 86.0 | 0.05 |
| 24 | 10 | 89.1 | 0.29 | 13 | 86.1 | 0.07 |
| 27 | 9.6 | 89.4 | 0.12 | 12 | 87.1 | 0.10 |
| 30 | 9.5 | 89.7 | 0.05 | 12 | 87.4 | 0.19 |
| 33 | 9.1 | 90.4 | 0.12 | 11 | 88.4 | 0.05 |
| 36 | 8.2 | 91.3 | 0.19 | 10 | 89.6 | 0.06 |
| 39 | 7.7 | 91.9 | 0.12 | 11 | 88.7 | 0.04 |
| 42 | 7.5 | 92.2 | 0.04 | 11 | 88.9 | 0.03 |
| 45 | 7.3 | 92.4 | 0.04 | 11 | 88.9 | 0.06 |

TABLE 6

| Reaction Time (hrs) | No Exchange of Liquor | | | Replensishment of Liquor at Every three hours | | |
|---|---|---|---|---|---|---|
| | Au Grade in Residue (g/t) | Leaching Ratio of Au (%) | Au Concentration In Liquor (mg/L) | Au Grade in Residue (g/t) | Leaching Ratio of Au (%) | Au Concentration In Liquor (mg/L) |
| 0 | 43 | 65.7 | 0.00 | 44 | 47.5 | 0.00 |
| 3 | — | — | — | 32 | 62.0 | 0.41 |
| 6 | — | — | — | 17 | 80.2 | 0.53 |
| 9 | — | — | — | 14 | 83.9 | 0.59 |
| 12 | — | — | — | 12 | 86.2 | 0.48 |
| 15 | — | — | — | 11 | 87.5 | 0.23 |
| 18 | — | — | — | 10 | 88.6 | 0.14 |
| 21 | — | — | — | 10 | 88.9 | 0.09 |
| 24 | 28 | 82.2 | 0.47 | 10 | 89.1 | 0.09 |

As is apparent from Table 6, the leaching ratio of gold is low when the liquor is not replenished, while the leaching ratio is high when the liquor is replenished. That is, the gold concentration in the liquor at the leaching exerts a great influence upon the leaching ratio of gold. It is, therefore, believed that the leaching of gold can be enhanced by maintaining the gold concentration in the liquor at a low level.

Example 7

The leach liquor (the second acidic aqueous solution) prepared contained 25 g/L of cupric chloride in terms of copper concentration, 5 g/L of ferric chloride in terms of iron concentration, 180 g/L of total chloride ions, which chloride is that of copper chloride, and iron chloride, and 22 g/L of sodium bromide in terms of bromide ions. As the raw material, the leach residue of the fourth copper leaching stage was used. This stage is precedent to the gold leaching. The raw material contained 1.3% of Cu, 21% of Fe and 45% of S. 640 g of the residue was added to 2.5 L of the leach liquor mentioned above.

The leach liquor was heated to 85 degree C. The residue of the raw material and coconut shell active carbon were charged to the leach liquor during stirring. The coconut shell active carbon was added in an amount greater than the upper limit of gold extraction. The leaching was thus carried out while blowing air at a flow rate of 0.2 L/min (an example of claim 11). A sample was taken at a predetermined time from the residue to analyze the gold grade in the residue. The coconut shell active carbon was 1 mm or more in size. The sampled active carbon and residue were separated by a sieve. The separated sieve was analyzed. In table 5, the experimental results of the present example are shown.

TABLE 7

| Leaching Time (h) | Grade of Au (g/t) | Leaching Ratio of Au (%) | Au Concentration (mg/L) |
|---|---|---|---|
| 0 | 66 | 28.9 | 0.00 |
| 3 | 22 | — | 0.04 |
| 6 | 19 | — | 0.02 |
| 9 | 15 | — | 0.05 |
| 12 | 14 | — | 0.20 |
| 15 | — | — | — |
| 18 | 11 | — | 0.09 |
| 21 | — | — | — |
| 24 | 10 | 89.6 | 0.22 |
| 27 | 9.6 | — | 0.11 |
| 30 | 9.1 | — | 0.27 |
| 33 | 9.4 | — | 0.04 |
| 36 | 10 | — | 0.06 |
| 39 | — | — | — |
| 42 | 10 | — | 0.07 |
| 45 | — | — | — |
| 48 | 9.8 | 91.5 | 0.17 |

As is apparent from Table 7, the leaching ratio of the present example, in which the active carbon is added, achieves 91.5% for leaching time of 48 hours. This result is approximately the same as Example 5, in which the leaching liquor is replenished. As is apparent from FIG. 2, the leaching of gold is promoted when the leaching is carried out while maintaining the gold concentration at a low level. When the leaching is continued while not replenishing the leaching liquor, the concentration of gold in the liquor is high and the leaching ratio is low. The leaching ratio is enhanced, when the concentration of gold in the liquor is maintained low. This can be achieved by replenishing the leach liquor or adding the active carbon. When the leaching ratio is enhanced, the leaching time can be shortened, with the result that the gold can be effectively leached.

Example 8

The leach liquor (the second acidic aqueous solution) prepared contained 25 g/L of cupric chloride in terms of copper concentration, 5 g/L of ferric chloride in terms of iron concentration, 180 g/L of total chloride ions, which chloride is that of copper chloride, and iron chloride, and 22 g/L of sodium bromide in terms of bromide ions. As the raw material, the leach residue of the fourth copper leaching stage was used. This stage is precedent to the gold leaching. The raw material contained 0.4% of Cu, 25% of Fe and 37% of S. 690 g of the residue was charged into 2.5 L of the leach liquor mentioned above.

Figure 2:
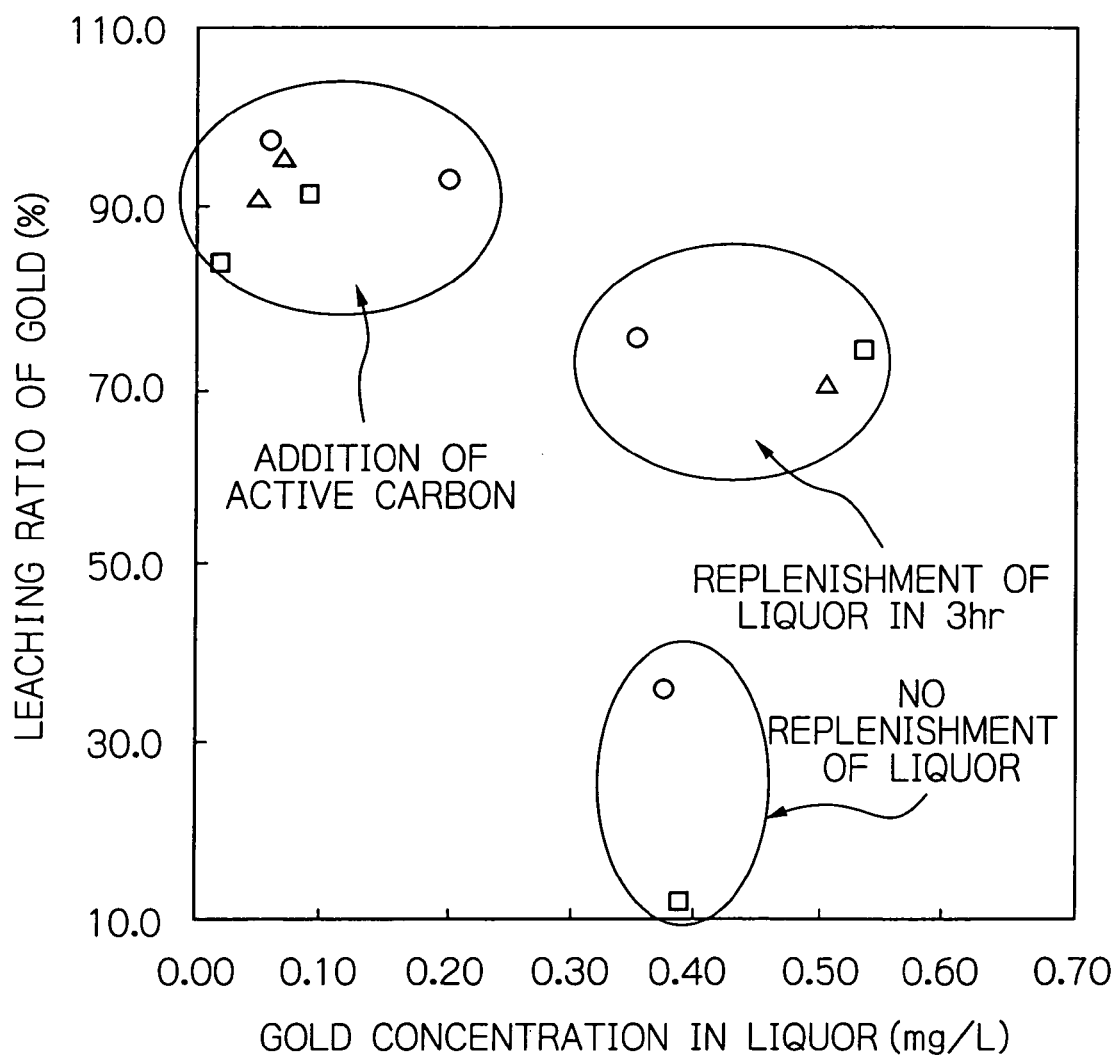
FIG. 2 is a graph showing an influence of addition of the active carbon upon the gold leaching.

The leach liquor was heated to 85 degree C. The residue of the raw material and coconut shell active carbon and lead nitrate were charged to the leach liquor during stirring. The leaching was thus carried out while blowing air at a flow rate of 0.2 L/min (an example of claim 11). A sample was taken at a predetermined time from the residue to analyze the gold grade in the residue. The coconut shell active carbon was 1 mm or more in size. As is known in the cyanide process, lead nitrate promotes the gold leaching. The addition amount of lead bromate was determined to 0.21 g taking into consideration of the cyanide process. In Table 8, the experimental results of the present example are shown. In FIG. 2, the sequential change of gold grade in the residue is shown when the lead nitrate is added.

TABLE 8

| Reaction Time (h) | Au Grade in Residue (g/t) | Leaching Ratio of Au (%) | Concentration of Au In Liquor (mg/L) |
|---|---|---|---|
| 0 | 22 | 73.0 | 0.00 |
| 3 | 7.4 | — | 0.14 |
| 6 | 6.6 | — | 0.09 |
| 9 | 5.9 | — | 0.07 |
| 12 | 5.6 | — | 0.06 |
| 15 | — | — | — |
| 18 | 5.4 | — | 0.01 |
| 21 | — | — | — |
| 24 | 5.6 | 93.2 | 0.01 |
| 27 | 5.2 | — | 0.04 |
| 30 | 5.3 | — | 0.02 |
| 33 | 5.0 | — | 0.03 |
| 36 | 5.4 | — | 0.02 |

TABLE 8-continued

| Reaction Time (h) | Au Grade in Residue (g/t) | Leaching Ratio of Au (%) | Concentration of Au In Liquor (mg/L) |
|---|---|---|---|
| 39 | — | — | — |
| 42 | 4.9 | — | 0.02 |
| 45 | — | — | — |
| 48 | 5.1 | 95.1 | 0.02 |

As is apparent from Table 8, the leaching ratio of gold is 93.2% at the leaching time of 24 hours and 95.1% at the leaching time of 48 hours. As is apparent from FIG. 2, the addition of lead nitrate outstandingly decreases the gold grade in the residue. It is, therefore, apparent that the addition of lead nitrate promotes the leaching of gold.

Example 9

The leach liquor (the first acidic aqueous solution) used contained 20 g/L of cupric chloride in terms of copper concentration, 2 g/L of ferric chloride in terms of iron concentration, 7 g/L of hydrochloric acid, 180 g/L of total chloride ions, which chloride is that of copper chloride, hydrochloric acid and iron chloride, and 22 g/L of sodium bromide in terms of bromide ions. As the raw material, the copper concentrate having a composition of 23% of Cu, 24% of Fe and 27% of S, was ground to 41 μm of the particle size P80 value. 600 g of the copper concentrate, which had been ground to a predetermined particle diameter, was charged into 4 L of the leach liquor mentioned above.

The leach liquor was heated to a predetermined temperature. The residue of the raw material concentrate was charged into the leach liquor during stirring. The leaching was thus carried out while blowing air at a flow rate of 1.0 L/min. After reaction for a predetermined time, filtration was carried out, and the leach residue was again subjected to the leaching in the leach liquor mentioned above (an example of claim 1, in which air is blown in the entire leaching step). This leaching was carried out in four stages. The sequential change of copper grade in the residue is observed. The leaching temperature and time in the first and second stages were 70 degree C. and 2 hours, respectively. The leaching temperature and time in the third and fourth stages were 85 degree C. and 5 hours, respectively. In Table 9, the copper-leaching conditions and the results are shown.

TABLE 9

| Reaction Stage | Reaction Time (hrs) Each Stage | Reaction Time (hrs) Accumulative | Reaction Temperature (°C.) | Air Blowing (L/min) | End of Reaction ORP (mv) | End of Reaction pH | Copper Grade in Residue (%) | Leaching Ratio of Copper (%) |
|---|---|---|---|---|---|---|---|---|
| Before Reaction | 0 | 0 | — | — | — | — | 23 | 0.0 |
| 1 | 2.0 | 2.0 | 70 | 1.0 | 413 | 1.94 | 21 | 14.0 |
| 2 | 2.0 | 2.0 | 70 | 1.0 | 431 | 1.87 | 17 | 38.8 |
| 3 | 5.0 | 9.0 | 85 | 1.0 | 422 | 1.85 | 5.3 | 83.5 |
| 4 | 5.0 | 14.0 | 85 | 1.0 | 511 | 1.51 | 0.6 | 98.3 |

Remarks.
ORP is measured by using an Ag/AgCl reference electrode.

The present example is related to 41 μm of the grain diameter P 80. The copper grade of the residue was decreased to 0.6% after the fourth stage and in the accumulative leaching time of 14 hours. The leaching ratio of copper amounts to 98.3%. The reaction time and temperature of the reaction stages may be varied at each stage. The reaction time can be shortened. As a result, the investing cost and thermal energy can be saved. Operation cost can be saved.

Example 10

Figure 3:
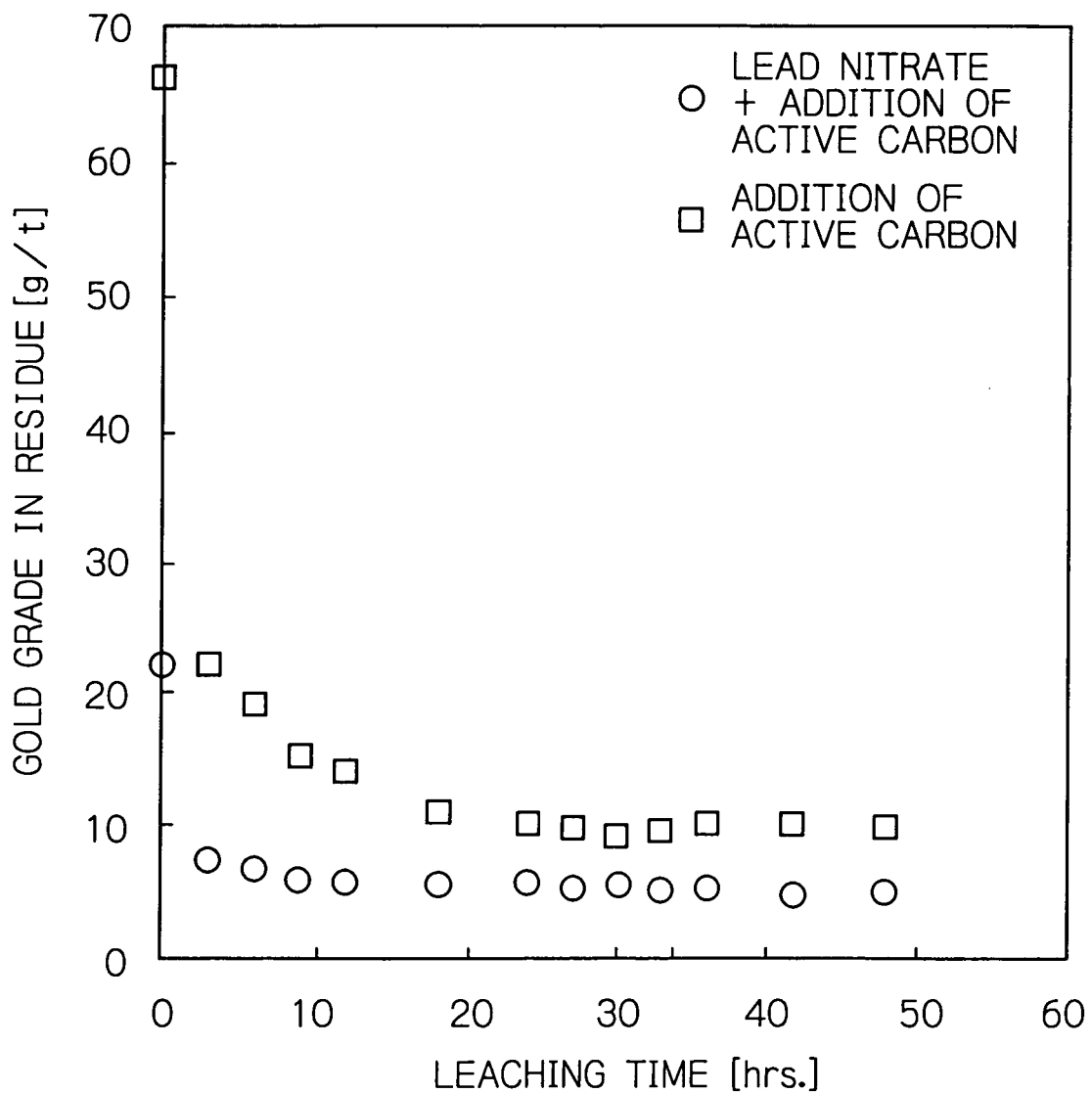
FIG. 3 is a graph showing an influence of addition of lead nitrate upon the gold leaching.

The leach liquor (the second acidic aqueous solution) prepared contained in dissolved mixture of 25 g/L of cupric chloride in terms of copper concentration, 5 g/L of ferric chloride in terms of iron concentration, 180 g/L of total chloride ions, which chloride is that of copper chloride, and iron chloride, and 22 g/L of sodium bromide in terms of bromide ions. As the raw material, the leach residue of the fourth copper leaching stage in Example 1 was used. The leaching was carried out by way of adding the raw material into the leach liquor, so that the pulp concentration was 200 g/L. The liquor was then stirred and air was always blown into the liquor at a rate of 0.2 L/min per litter of the liquor. The raw material was the one, which was ground by a pot mill prior to copper leaching (grain size—P80 Value—40 μm) and the one as The leach liquor was heated to 85 degree C. The raw material mentioned above and the coconut shell active carbon were charged to the leach liquor during stirring. The coconut shell active carbon was added in an amount greater than the upper limit of gold extraction. A sample was taken at a predetermined time from the residue to analyze the gold grade in the residue. The coconut shell active carbon was 1 mm or more in size. The sampled active carbon and residue were separated by a sieve. The separated residue was analyzed. In Table 10, the experimental results of the present example are shown. In FIG. 3, the sequential change of gold grade in the residue was analyzed.

TABLE 10

| Leaching Time (h) | Particle Diameter - 40 μm | | Particle Diameter - 185 μm | |
|---|---|---|---|---|
| | Au Grade in Residue (g/t) | Leaching Ratio of Au (%) | Au Grade in Residue (g/t) | Leaching Ratio of Au (%) |
| 0 | 44 | 47.5 | 30 | 11.4 |
| 3 | 32 | 62.0 | 18 | — |
| 6 | 17 | 80.2 | 15 | — |
| 9 | 14 | 83.9 | 17 | — |
| 12 | 12 | 86.2 | 16 | — |
| 15 | 11 | 87.5 | 13 | — |
| 18 | 10 | 88.6 | — | — |
| 21 | 10 | 88.9 | 13 | — |
| 24 | 10 | 89.1 | — | — |
| 27 | 9.6 | 89.4 | 12 | — |
| 30 | 9.5 | 89.7 | — | — |
| 33 | 9.1 | 90.4 | 12 | — |
| 36 | 8.2 | 91.3 | — | — |
| 39 | 7.7 | 91.9 | 14 | — |
| 42 | 7.5 | 92.2 | — | — |
| 45 | 7.3 | 92.4 | 12 | 82.1 |

As is apparent from Table 10, when the particle size P80 value of the raw material is 40 μm, the leaching ratio of gold amounts to 92.4% at the leaching time of 45 hours. However, when the particle size P80 of the raw material is 185 μm, the leaching ratio amounts to only 82.1% at the leaching time of 45 hours.

Example 11

The leach liquor (the second acidic aqueous solution) prepared contained 20 g/L of cupric chloride in terms of copper concentration, 2 g/L of ferric chloride in terms of iron concentration, 7 g/L of hydrochloride, 180 g/L of total chloride ions, which chloride is that of copper chloride, hydrochloric acid and iron chloride, and 22 g/L of sodium bromide in terms of bromide ions. As the raw material, the pulverized copper concentrate, which has a composition of 23% of Cu, 24% of Fe and 27% of S, was used. The raw material was charged into the leach liquor mentioned above to leach it. The copper leaching was carried out in four stages. The filtered liquor at each stage was mixed with one another. A liquor in volume of 4 L was taken from the mixed liquor and was used as the pre-oxidizing liquor.

The pre-oxidizing liquor was heated to a predetermined temperature and then air was blown at a rate of 1.0 L/min into the pre-oxidizing liquor. After the oxidation reaction for a predetermined time, filtration was carried out. The resultant post-oxidation liquor and the oxidation residue were analyzed. In Table 11, the results of oxidation test are shown (an example of the air oxidation step of claim 1).

TABLE 11

| | Amount | Cu g/L | Cu g | Fe g/L | Fe G | As mg/L | As g |
|---|---|---|---|---|---|---|---|
| Pre-oxidation Liquor | 4.0 L | 28.5 | 114.0 | 3.8 | 15.3 | 46.7 | 0.19 |
| Post-oxidation Liquor | 4.1 L | 28.2 | 116.3 | 1.3 | 5.4 | <1 | <0.01 |
| Oxidation Residue | 17.5 g | 0.2※ | 0.0 | 48.0※ | 8.4 | 0.73※ | 0.13 |

Remarks※: Grade of the oxidation residue is expressed in %.

As is apparent from Table 11, As, which is present in the pre-oxidizing liquor as an impurity, is contained in and is discharged as the oxidation residue. The impurities are, therefore, not left in the recovery system, and the copper and gold are, therefore, selectively recovered. The recovered copper and gold have high purity. In addition, such raw material having high impurity grade and hence could not be conventionally treated, can be treated by the present invention.

INDUSTRIAL APPLICABILITY

Since the leaching reactions of ore are promoted by the method of present invention, a recovery plant of copper and gold is of a small scale, and the reagents can be saved. In addition, the leaching is carried out under the atmospheric pressure and lower than the boiling point of the lixiviant, the processing cost is very low. Furthermore, such raw material as inappropriate for the smelting can be successfully treated.

The invention claimed is:

1. A method for recovering copper and gold by treating sulfide ore containing gold or the sulfide ore bearing silica ore, in which gold is contained (hereinafter referred to as "the raw material"), wherein the method comprises:
    a copper-leaching step, in which the raw material is added into a first acidic aqueous solution, which contains chloride and bromide of alkali metal or alkali earth-metal, as well as chlorides of copper and iron or bromides of copper and iron, and air is blown in at least a certain period, into the first acidic aqueous solution, thereby obtaining a leach liquor, in which cuprous ions and cupric ions are contained;
    a solid-liquid separating step, in which a resultant unleached solid material of said copper-leaching step and the leached copper are subjected to solid-liquid separation;
    an air-blowing step, in which air is blown into the post solid-liquid separation liquor, thereby oxidizing at least a part of the cuprous ions contained in the post solid-liquid separation liquor to the cupric ions, oxidizing the iron leached in the copper-leaching step, and simultaneously co-precipitating impurities comprising iron leached in the copper-leaching step, followed by separating the precipitates;
    a copper-extracting step, in which copper is extracted from the post-liquor of the air-blowing step, from which liquor the precipitates have been separated; and,
    a gold-recovery step, in which the residue, which has been separated in the solid-liquid separating step, is added to a second acidic aqueous solution, which contains chloride and bromide of alkali metal or alkali earth-metal, as well as chlorides of copper and iron or bromides of copper and iron, and air is blown into the second acidic aqueous solution under the atmospheric pressure, at a temperature lower than a boiling point of the second acidic aqueous solution, and in the presence of iron, wherein said gold-recovery step does not include chlorine gas.

2. A method for recovering copper and gold from ore according to claim 1, wherein the gold concentration of the second acidic aqueous solution is maintained at 1.5 mg/L or less.

3. A method for recovering copper and gold from ore according to claim 1 or 2, wherein the copper leaching step comprises a plurality stages, in which the leach residue of a preceding step is successively transferred to a subsequent step, and a leach liquor is distributed to the plurality of the copper leaching stages.

4. A method for recovering copper and gold from ore according to claim 3, wherein the post leach liquor of the respective plurality steps of copper leaching is withdrawn from the respective steps and is totally mixed with each other, and subsequently, the mixed leach liquor is supplied to the air-blowing step.

5. A method for recovering copper and gold from ore according to claim 1, wherein the first acidic aqueous solution and the second acidic aqueous solution contain the chloride ions and the bromide ions at a total concentration in a range of from 120 g/L to 200 g/L.

6. A method for recovering copper and gold from ore according to claim 1, wherein the leaching temperature in the copper leaching step is 70 degree C. or higher.

7. A method for recovering copper and gold from ore according to claim 1, wherein the copper extracting step consists of solvent extraction, ion-exchange, electrowinning or substitution, or combination of them.

8. A method for recovering copper and gold from ore according to claim 7, wherein essentially all of the copper in cuporus state is oxidized to the copper in cupric state in the air-blowing step, and the solvent extraction is carried out in the copper extracting step.

9. A method for recovering copper and gold from ore according to claim 8, wherein the solvent extracted copper is scrubbed into the sulfuric acid solution.

10. A method for recovering copper and gold from ore according to claim 1, wherein the leaching temperature in the gold recovering step is 60 degree C. or higher.

11. A method for recovering copper and gold from ore according to claim 1, wherein the active carbon or active carbon plus lead nitrate is charged into the second acidic aqueous solution.

12. A method for recovering copper and gold from ore according to claim 1, wherein it comprises subsequent to the gold recovering step a treatment step by active carbon adsorption, solvent extraction, ion exchange substitution, or any combination of them.

13. A method for recovering copper and gold from ore according to claim 1, said method further comprising grinding the raw material for grinding the raw material so that 80% or more of the entire raw material is ground to a particle diameter of 40 μm or less.

14. A method for recovering copper and gold from ore according to claim 1, said method further comprising recovering valuable metal other than copper and gold from the copper leach solution, the copper leach-residue or the gold leach residue.

15. A method according to claim 1, wherein said copper-leaching step is performed under atmospheric pressure.

16. A method for recovering copper and gold by treating sulfide ore containing gold or the sulfide ore bearing silica ore, in which gold is contained (hereinafter referred to as "the raw material"), wherein the method comprises:
   a copper-leaching step, in which the raw material is added into a first acidic aqueous solution, which contains chloride and bromide of alkali metal or alkali earth-metal, as well as chlorides of copper and iron or bromides of copper and iron, and air is blown in at least a certain period, into the first acidic aqueous solution, thereby obtaining a leach liquor, in which cuprous ions and cupric ions are contained;
   a solid-liquid separating step, in which a resultant unleached solid material of said copper-leaching step and the leached copper are subjected to solid-liquid separation;
   an air-blowing step, in which air is blown into the post solid-liquid separation liquor, thereby oxidizing at least a part of the cuprous ions contained in the post solid-liquid separation liquor to the cupric ions, oxidizing the iron leached in the copper-leaching step, and simultaneously co-precipitating impurities comprising iron leached in the copper-leaching step, followed by separating the precipitates;
   a copper-extracting step, in which copper is extracted from the post-liquor of the air-blowing step, from which liquor the precipitates have been separated; and,
   a gold-recovery step, in which the residue, which has been separated in the solid-liquid separating step, is added to a second acidic aqueous solution, which contains chloride and bromide of alkali metal or alkali earth-metal, as well as chlorides of copper and iron or bromides of copper and iron, and air is blown into the second acidic aqueous solution under atmospheric pressure, at a temperature lower than a boiling point of the second acidic aqueous solution, wherein said gold-recovery step does not include chlorine gas.

* * * * *